US010295020B2

(12) United States Patent
Rayner (10) Patent No.: US 10,295,020 B2
(45) Date of Patent: May 21, 2019

(54) RELATING TO A SECONDARY DRIVE UNIT (71) Applicant: AUGER TORQUE EUROPE LIMITED, Gloucestershire (GB)

(72) Inventor: Alister Rayner, Gloucestershire (GB)

(73) Assignee: AUGER TORQUE EUROPE LIMITED, Gloucestershire (GB)

(*) Notice: Subject to any disclaimer, the term of this patent is extended or adjusted under 35 U.S.C. 154(b) by 97 days.

(21) Appl. No.: 15/118,659

(22) PCT Filed: Jan. 29, 2015

(86) PCT No.: PCT/GB2015/050208
§ 371 (c)(1),
(2) Date: Aug. 12, 2016

(87) PCT Pub. No.: WO2015/121615
PCT Pub. Date: Aug. 20, 2015

(65) Prior Publication Data
US 2017/0074355 A1     Mar. 16, 2017

(30) Foreign Application Priority Data

Feb. 13, 2014   (GB) .................................. 1402515.9

(51) Int. Cl.
*F16H 1/28*     (2006.01)
*F16H 1/16*     (2006.01)
(Continued)

(52) U.S. Cl.
CPC .............. *F16H 1/2827* (2013.01); *E21B 3/02* (2013.01); *E21B 7/02* (2013.01); *E21B 17/03* (2013.01);
(Continued)

(58) Field of Classification Search
CPC ...... F16H 1/2827; F16H 1/46; F16H 57/0413; F16H 57/043; F16H 57/0431; F16H 57/082; E21B 3/02; E21B 7/02; E21B 17/03
See application file for complete search history.

(56) References Cited

U.S. PATENT DOCUMENTS 2,130,111 A * 9/1938 Whitney ............... B25B 23/141
                                                          310/50
2,583,140 A * 1/1952 Else ........................ B66D 1/12
                                                          188/166
(Continued)

FOREIGN PATENT DOCUMENTS

AU     2011250864 A1     6/2012
CN       101975031 A     2/2011
(Continued)

OTHER PUBLICATIONS

British Search Reports Corresponding to 1402515.9 dated Jul. 23, 2014.
(Continued)

*Primary Examiner* — Jacob S Scott
*Assistant Examiner* — Tinh Dang
(74) *Attorney, Agent, or Firm* — Davis & Bujold PLLC; Michael Bujold (57) ABSTRACT

A secondary drive unit (10) for demountable attachment to a machine having a primary drive unit and power take-off, the secondary drive unit (10) comprises a housing (12), a drivable input element (16) drivable by the machine at one end of the housing (12), a driven output element (18) at the other end of the housing (12) for driving a tool and/or another machine, and at least one rotatable gear carrier (44) in the housing (12) drivable by the drivable input element (16). An interior surface of the housing (12) includes a radially-inwardly projecting gear-carrier stop (58) overlap-
(Continued)

ping the gear carrier (44). A low-friction rubbing element (62) is interposed between the gear-carrier stop (58) and the gear carrier (44) to prevent or limit gear-carrier lift. This prevents or limits undue lateral strain along a central rotational axis of the drive unit (10), and thus a possibility of internal shearing.

18 Claims, 5 Drawing Sheets

(51) Int. Cl.
    *F16H 57/04*     (2010.01)
    *E21B 3/02*     (2006.01)
    *E21B 7/02*     (2006.01)
    *E21B 17/03*     (2006.01)
    *F16H 57/08*     (2006.01)
    *F16H 1/46*     (2006.01)

(52) U.S. Cl.
    CPC ............ *F16H 1/46* (2013.01); *F16H 57/043* (2013.01); *F16H 57/0413* (2013.01); *F16H 57/0431* (2013.01); *F16H 57/082* (2013.01)

(56) References Cited

U.S. PATENT DOCUMENTS

| | | | |
|---|---|---|---|
| 3,292,715 A | 12/1966 | Balogh | |
| 4,615,231 A | 10/1986 | Takahashi | |
| 5,593,360 A * | 1/1997 | Ishida | F16H 1/46 475/331 |
| 6,974,401 B2 | 12/2005 | O'Leary et al. | |
| 7,377,870 B2 | 5/2008 | Matsushita et al. | |
| 8,556,761 B1 * | 10/2013 | Carlton | F16H 57/0486 475/159 |
| 9,790,738 B2 * | 10/2017 | Jung | E06B 9/56 |
| 2005/0183380 A1 * | 8/2005 | Sato | B23B 51/0045 52/698 |
| 2005/0274508 A1 * | 12/2005 | Folk | E21B 19/02 166/77.52 |
| 2007/0072735 A1 * | 3/2007 | Coffey | F16H 57/043 475/346 |
| 2009/0159271 A1 * | 6/2009 | De Jong | E21B 3/02 166/244.1 |
| 2010/0298080 A1 | 11/2010 | Wright | |
| 2013/0074630 A1 * | 3/2013 | Jarvinen | F16H 57/0413 74/467 |
| 2013/0189040 A1 | 7/2013 | Atchley et al. | |
| 2014/0024489 A1 * | 1/2014 | Heber | B25B 21/00 475/299 |

FOREIGN PATENT DOCUMENTS

| | | |
|---|---|---|
| CN | 202040279 U | 11/2011 |
| CN | 202971858 U | 6/2013 |
| EP | 1099882 A2 | 5/2001 |

OTHER PUBLICATIONS

Patents Act 1977 Examination Report under Section 18(3) issued in corresponding British Patent Application No. GB1402515.9 dated Jun. 1, 2017.

Patents Act 1977 Examination Report under Section 18(3) issued in corresponding British Patent Application No. GB1402515.9 dated Mar. 7, 2018.

Australian Examination Report issued in corresponding Australian Patent Application No. 2015216752 dated Jun. 15, 2018.

Patents Act 1977 Examination Report under Section 18(3) issued in corresponding British Patent Application No. GB1402515.9 dated Jun. 25, 2018.

Patents Act 1977 Examination Report under Section 18(3) issued in corresponding British Patent Application No. GB1402515.9 dated Sep. 18, 2018.

Patent Act 1977: Report of telephone conversation between Matt Cyrson and Examiner Brendan Churchill held Oct. 8, 2018.

International Search Report for PCT/GB2015/050208 dated Feb. 16, 2016 (previously submitted on Aug. 12, 2016.).

Written Opinion of the International Search Authority for PCT/GB2015/050208 dated Feb. 16, 2016 (previously submitted Aug. 12, 2016).

* cited by examiner

RELATING TO A SECONDARY DRIVE UNIT

The present invention relates to a portable secondary drive unit, and more particularly but not necessarily exclusively to an earth-moving-tool drive unit. The drive unit is a mobile machine-demountable drive unit which can be conveniently utilised with any machine having a primary, typically motive, drive unit which incorporates a power take-off to which this secondary drive unit can be coupled. In particular, but again not necessarily exclusively, the secondary drive unit is suitable for a ground auger and/or earth drill bit, but equally may be utilised as a driver for screw anchor installation, also known as helical screw piles, ground anchor installation, earth core drilling, and/or power transmission for non-tool bit related applications, such as a conveyor system. The invention also relates to such a drive unit which is modular, and to methods utilising the drive unit to prevent or limit gear carrier lift, to improve internal lubrication, and/or to prevent or limit detachment from a drive output shaft.

A secondary drive unit specifically for an earth-moving tool, such as a ground auger or earth drill bit, is known, and one example is provided by Auger Torque Europe Limited of Hazleton, Cheltenham, GL54 4DX, United Kingdom. Such a drive unit is versatile and releasably attachable to an articulatable arm of an excavator or back hoe, to a mini loader, to a truck crane, and/or to a skidsteer loader to name a few variants of suitable earth-moving-tool machines. The drive unit is typically hydraulically driven from the earth-moving-tool machine, and thus typically utilises a hydraulic motor powering a planetary or epicyclic reduction drive outputting to a drive shaft to which the required rotatable earth-moving bit is detachably mounted.

Although highly robust with proven longevity, it has been determined that an axially extending tie-in element for interengaging neighbouring gear sets could be improved. It has been noted that internal gear carriers can lift and thus slightly separate during use, resulting in lateral strain and potential breakage of the axial tie-in element.

Furthermore, a flow path for internal lubrication liquid to move from an upper interior portion of a drive unit housing to a lower interior portion is currently complex and requires flow channels in the walls of the housing and flexible pipework externally of the housing. In a harsh and sometimes sub-zero working environment, this is not particularly satisfactory.

It is also preferred to improve overall the internal lubrication of the stacked gear sets, if possible, thereby seeking to further improve longevity.

Additionally, being able to provide a modular drive unit in order to accommodate different working requirements would be advantageous in reducing manufacturing costs and stock levels.

The present invention seeks to provide a solution to these problems.

According to a first aspect of the invention, there is provided a secondary drive unit for demountable attachment to a machine having a primary drive unit and power take-off, the secondary drive unit comprising a housing attachable to said machine, a drivable input element drivable by the machine at or adjacent to one end of the housing, a driven output element at or adjacent to the other end of the housing for driving a tool and/or another machine, and at least one rotatable gear carrier in the housing drivable by the drivable input element, an interior surface of the housing including a radially-inwardly projecting gear-carrier stop which overlaps an upper edge of the gear carrier, a low-friction rubbing element formed of a low-friction material relative to that of the housing interposed between the gear-carrier stop and the gear carrier to prevent or limit gear-carrier lift.

Preferable and/or optional features of the first aspect of the invention are set forth in claims 2 to 6, inclusive.

According to a second aspect of the invention, there is provided a method of preventing or limiting gear carrier lift within a housing of a drive unit in accordance with the first aspect of the invention, the method comprising the step of providing a gear-carrier stop as part of an interior surface of the housing, the gear-carrier stop overlapping an upper perimeter edge of a gear carrier, and interposing a low-friction rubbing element between the gear-carrier stop and the gear carrier so that in use axial upward movement of the gear carrier is prevented or limited.

According to a third aspect of the invention, there is provided a secondary drive unit for demountable attachment to a machine having a primary drive unit and power take-off, the secondary drive unit comprising a housing attachable to said machine, a drivable input element drivable by the machine at or adjacent to one end of the housing, a driven output element at or adjacent to the other end of the housing for driving a tool and/or another machine, at least one rotatable gear carrier in the housing drivable by the drivable input element, a sun gear coaxially aligned within the said gear carrier, a sun-gear drive shaft to which the sun gear is mounted, and an internal lubrication channel in at least the sun gear for circulating lubrication liquid from an upper interior portion of the housing to a lower interior portion of the housing.

Preferable and/or optional features of the third aspect of the invention are set forth in claims 9 to 14, inclusive.

According to a fourth aspect of the invention, there is provided a method of improving lubrication liquid flow within a housing of a secondary drive unit, in accordance with the third aspect of the invention, the method comprising the step of providing an axial internal lubrication channel within a sun gear mounted within a gear carrier, whereby lubrication liquid flows from an upper interior portion of the housing to a lower interior portion of the housing on a rotational axis of the sun gear.

According to a fifth aspect of the invention, there is provided a secondary drive unit for demountable attachment to a machine having a primary drive unit and power take-off, the secondary drive unit comprising a housing attachable to said machine, a drivable input element drivable by the machine at or adjacent to one end of the housing, a driven output element at or adjacent to the other end of the housing for driving a tool and/or another machine, at least one rotatable gear carrier in the housing drivable by the drivable input element, a sun gear coaxially aligned within the said gear carrier, a lubricating bearing element on which the sun gear and/or a sun-gear drive shaft is seated, and a primary internal lubrication channel in the sun gear and/or sun-gear drive shaft and the lubricating bearing element for circulating lubrication liquid from an upper interior portion of the housing to a lower interior portion of the housing, the lubricating bearing element including at least one radially-outwardly extending secondary lubrication channel of reducing, cross-section which, in use, imparts a pressure increase to lubrication liquid moving along a longitudinal extent of the secondary lubrication channel thereby causing hydraulic lift of the associated sun gear and/or sun-gear drive shaft.

Preferable and/or optional features of the fifth aspect of the invention are set forth in claims 17 to 20, inclusive.

According to a sixth aspect of the invention, there is provided a method of improving lubrication at a sun gear and/or sun-gear drive shaft of a secondary drive unit in accordance with the fifth aspect of the invention, the method comprising the steps of: a] seating the sun gear and/or the sun-gear drive shaft on a lubricating bearing element having at least one radially-outwardly extending lubrication channel of reducing cross-section, and b] providing lubrication liquid flow in the sun gear and/or the sun-gear drive shaft and the lubricating bearing element such that a portion of said lubrication liquid flows into the said at least one radially-outwardly extending lubrication channel, the reducing cross-section imparting a pressure increase to the lubrication liquid moving along a longitudinal extent of the said at least one radially-outwardly extending lubrication channel causing hydraulic lift of the associated sun gear and/or sun-gear drive shaft.

According to a seventh aspect of the invention, there is provided a secondary drive unit for demountable attachment to a machine having a primary drive unit and power take-off, the secondary drive unit comprising a housing attachable to said machine, a drivable input element at or adjacent to one end of the housing, a drivable input element drivable by the machine at or adjacent to one end of the housing, a driven output element at or adjacent to the other end of the housing for driving a tool and/or another machine, at least one rotatable gear carrier in the housing drivable by the drivable input element, and a lubrication heating system having at least one electrically-operable heating element, a temperature sensor for monitoring a lubrication temperature within the housing, and a controller for energising the heating element based on a temperature sensed by the temperature sensor.

Preferable and/or optional features of the seventh aspect of the invention are set forth in claims 23 to 26, inclusive.

According to an eighth aspect of the invention, there is provided a method of warming lubrication liquid in a housing of a secondary drive unit, in accordance with the seventh aspect of the invention, the method comprising the step of electrically connecting a controller of the lubrication system to a machine having a primary drive unit, the controller automatically controlling the heating element based on an energisation status of the machine and an output of the temperature sensor.

According to a ninth aspect of the invention, there is provided a modular secondary drive unit for demountable attachment to a machine having a primary drive unit and power take-off, the secondary drive unit comprising a plurality of housing elements interengagable to form a modular housing attachable to a said machine, a drivable input element drivable by the machine at or adjacent to one end of the modular housing, a driven output element at or adjacent to the other end of the modular housing for driving a tool and/or another machine, each housing element including an epicyclic gear set which is of a different size to that of a neighbouring said housing element, the epicyclic gear sets being interengagable to provide drive reduction between the drivable input element and the driven output element.

According to a tenth aspect of the invention, there is provided a secondary drive unit for demountable attachment to a machine having a primary drive unit and power take-off, the secondary drive unit comprising a housing attachable to said machine, a drivable input element drivable by the machine at or adjacent to one end of the housing, a driven output element at or adjacent to the other end of the housing for driving a tool and/or another machine, and anti-disengagement means for preventing or limiting unintentional disengagement of said tool and/or said other machine from the driven output element.

Preferable and/or optional features of the tenth aspect of the invention are set forth in claims 30 to 36, inclusive.

The invention will now be more particularly described, by way of example only, with reference to the accompanying drawings, in which.

Figure 1:
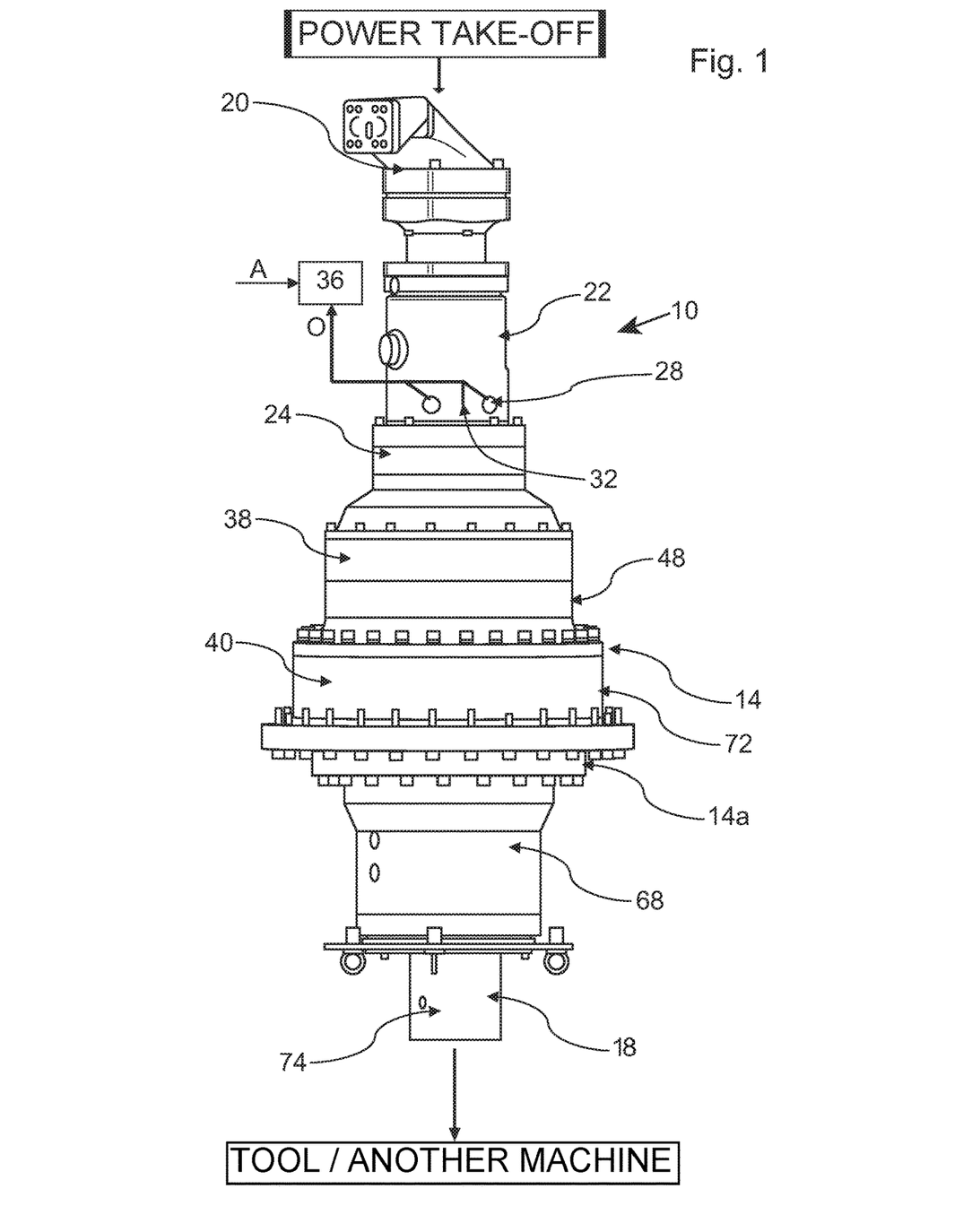
FIG. 1 shows one embodiment of an earth-moving-tool drive unit, in accordance with the present invention.
Figure 2:
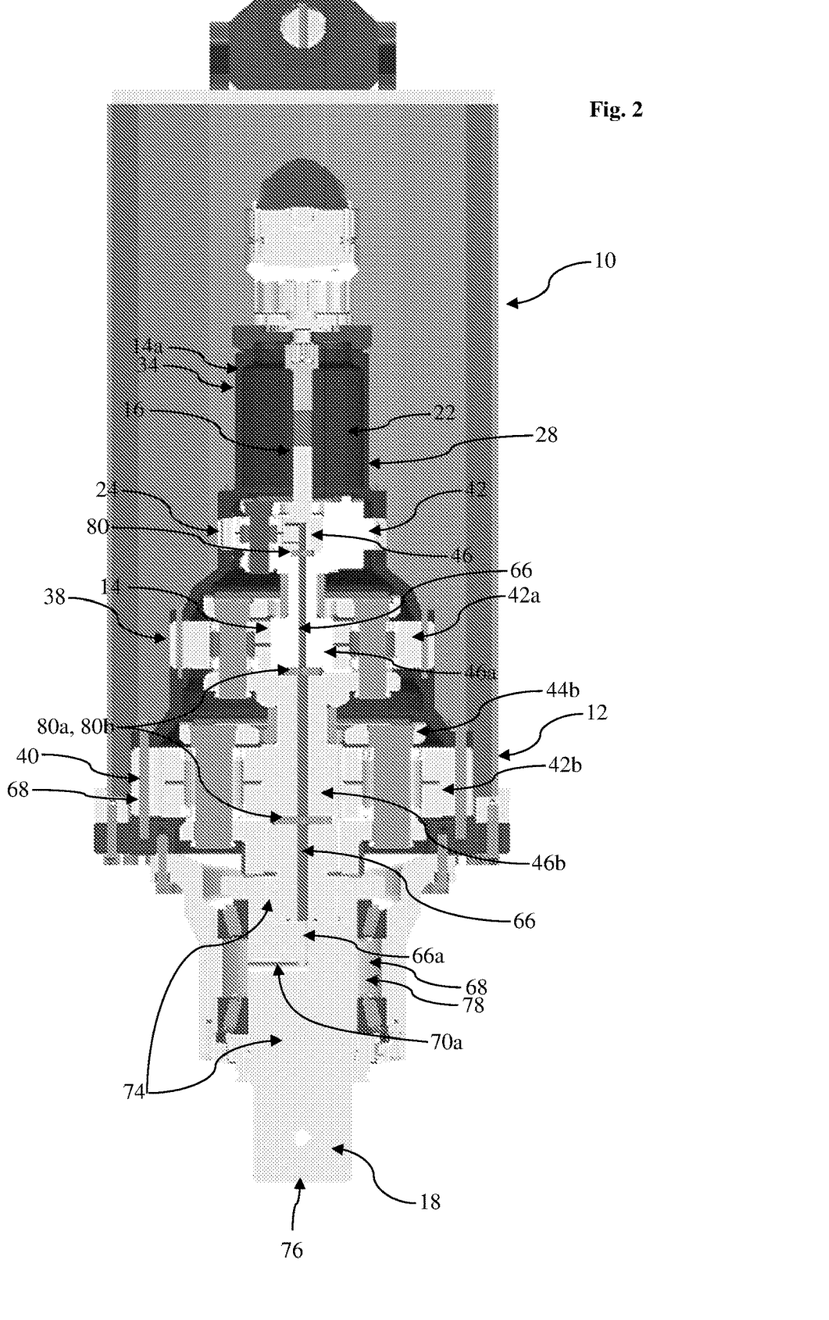
FIG. 2 is an axial cross-sectional view of the drive unit, shown in FIG. 1.

Referring to the drawings, there is shown a portable secondary drive unit 10 which comprises a housing 12, and in this case a multi-stage epicyclic reduction drive 14 within the housing 12 which interconnects a drivable input element 16 at an upper end of the housing 12, and a driven output element 18 at a lower end of the housing 12.

The multi-stage epicyclic reduction drive 14 has a drive housing 14a in this embodiment which is modular, as will be described in more detail hereinafter. However, the drive housing may be a single unitary or substantially unitary enclosure closable by an end cap or plate at each end. Equally, the drive housing may be formed of two clam-shell type parts separable axially, thereby again not being modular, but still providing a two engagable-body part housing.

The housing 12 and the drive housing 14a are preferably rigid cast or moulded metal, but other forms of material may be considered.

Although the drivable input element 16 and the driven output element 18 are at ends of the housing 12, it may be feasible to have one or both of these elements extending laterally of the longitudinal extent of the housing, dependent on necessity.

In this embodiment, a hydraulic motor 20 is provided at the upper end of the housing 12 for driving the drivable input element 16 positioned internally and coaxially with the housing 12. The hydraulic motor 20 is drivable by a hydraulic power output of an associated earth-moving-tool or other suitable machine having a primary, typically motive, permanently installed drive unit. Such earth-moving-tool machines with suitable releasably connectable and controllable hydraulic power take-offs, for example and not limited to an excavator, digger, back-hoe, and skidsteer, are well known, and therefore further detailed description is omitted.

Although a hydraulic motor 20 is suggested, any suitable motor, such as electric, pneumatic or internal combustion, may be utilised to drive the drivable input element 16.

Figure 3:
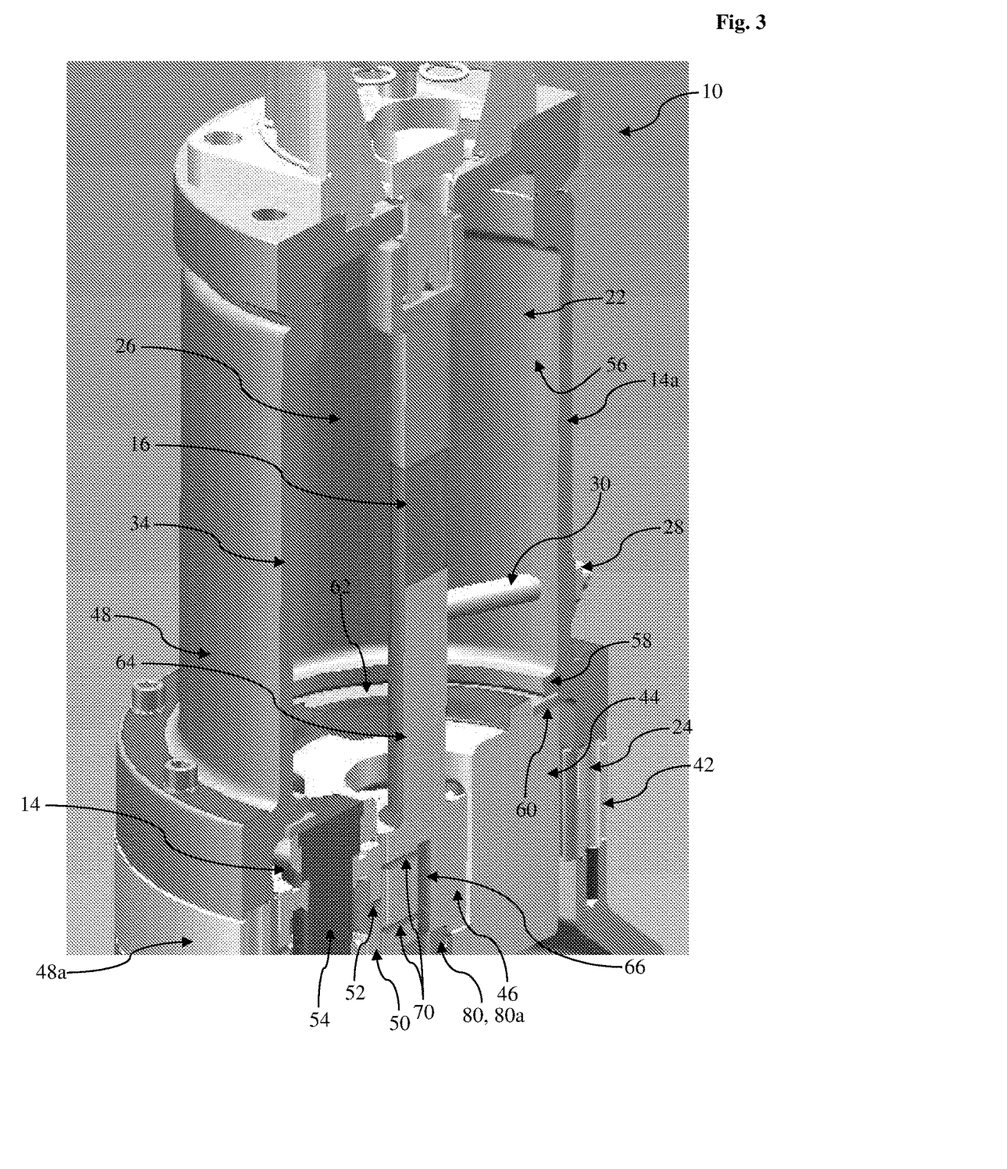
FIG. 3 is an enlarged view of an upper portion of the drive unit shown in FIG. 2, and showing an interior of a housing including part of a lubrication heating system.

The drivable input element 16 in this case is a rigid elongate shaft which extends axially through a generally cylindrical upper housing portion 22 to a first epicyclic gear stage 24. The upper housing portion 22 provides an upper lubrication-liquid cavity 26 of sufficient volume to form a lubrication liquid reservoir. A lubrication heating system 28, which may be dispensed with in some situations, is provided at least in part within the upper housing portion 22, and in this case includes two circumferentially spaced apart heating elements 30 and a temperature sensor 32.

Each heating element 30 is a rectilinear elongate heating shaft mounted through a housing side wall 34 in cantilevered fashion, so as to terminate proximal to the drivable input element 16. The heating element 30 is electrically operable, and is thus releasably connectable to an electrical power take-off of the drive input machine, when the drive unit 10 is, preferably releasably, mounted thereto.

Similarly, the temperature sensor 32 is also mounted through the side wall 34 of the drive housing 14a, in this case interposed between the two heating elements 30.

A controller 36 forming part of the lubrication heating system 28 controls each heating element 30 based on an activation status signal A from the drive input machine and an output signal O from the temperature sensor 32. Preferably, if the temperature sensor 32 determines that the lubrication liquid is below minus 10 degrees C., or another predetermined low temperature, on activation of the drive input machine, a warming cycle will be activated by the controller 36, whereby the heating elements 30 are energised to heat the lubrication liquid in at least the lubrication liquid reservoir. Beneficially, the controller 36 may include programmable logic which disables the hydraulic motor 20 until it is determined via the temperature sensor 32 that the lubrication liquid is above minus 10 degrees C. or the other predetermined low temperature. This reduces wear within the drive unit 10, and thus improves work life longevity.

The controller 36 may be incorporated on or in the housing 12, or may be remote from the drive unit 10, for example, on the drive input machine. Furthermore, although two heating elements 30 are preferred, only one heating element or more than two heating elements may be utilised. For example, in the case of only one heating element, the heating element may be spirally or helically formed to extend around the drivable input element 16 or to be to one side within the upper housing portion 22.

The first epicyclic gear stage 24 has a smaller first dimension or size than the subsequent epicyclic gear stages, in this case being a second epicyclic gear stage 38 and a third epicyclic gear stage 40 to provide a reduction drive to the driven output element 18. However, each epicyclic gear stage, irrespective of size, has a generally similar construction, and therefore only the first epicyclic gear stage 24 will be described in particular detail, and similarly references are utilised for the second and third epicyclic gear stages 38, 40.

The first epicyclic gear stage 24 includes an outer ring gear 42, a planetary gear carrier 44, and a sun gear 46. The ring gear 42 and the sun gear 46 are coaxial with each other and with an interior of the drive housing 14a. Beneficially, an outer surface 48a of the ring gear may conveniently form part of an outer surface 48 of the drive housing 14a.

Each planet gear 50 is preferably hollow, having at least one radial lubrication channel 52 extending from a circumferential tooth surface laterally of the axial extent. Lubrication liquid can thus flow in each planet gear 50 to lubricate mounting bearings 50a journaled with a support shaft 54 carried by the gear carrier 44.

The support shafts 54 also conveniently engage upper and lower carrier plates of the gear carrier 44, thereby sandwiching the planet gears 50 therebetween. Alternatively, the gear carrier 44 may be integrally formed as one-piece, for example, from cast or moulded metal, with the planet gears 50 locatable therein and held in place by the support shafts 54.

Figure 4:
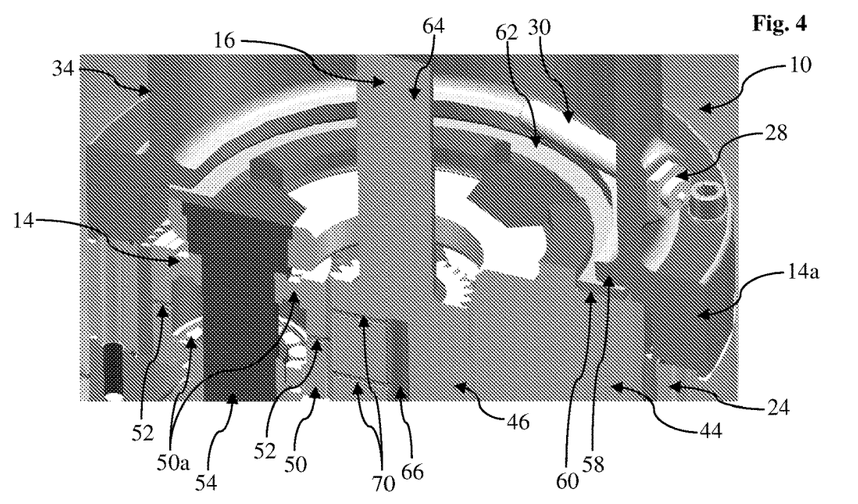
FIG. 4 is a further enlarged view of part of the upper portion of the drive unit shown in FIG. 3, showing a low-friction bushing.

To prevent or limit undesirable separation of the neighbouring epicyclic gear stages, and thus reducing lateral strain therebetween, an internal wall 56 of the drive housing 14a in this case being at a or adjacent to a distal end of the upper housing portion 22 is formed with a radially-inwardly projecting shoulder resulting in a gear-carrier stop 58. The gear-carrier stop 58 is endless in this embodiment, although it may be discontinuous in some cases, and overlaps an upper outermost perimeter edge of the gear carrier 44.

A ring-like seat 60 is provided on an upper surface of the gear carrier 44, at or adjacent to the upper outermost perimeter edge. This may conveniently be formed by a stepped portion being formed at the outer perimeter edge of the gear carrier 44. Seated on the ring-like seat 60 is a low-friction rubbing element 62, such as a bushing or washer, formed of a low-friction material, for example, a self-lubricating plastics such as Oilon®, relative to that of the drive housing 14a. The rubbing element 62 in this embodiment is a uniformly continuous annulus, which is interposed between the gear-carrier stop 58 and the gear carrier 44.

Consequently, in use, as the epicyclic gear mechanisms move and tend to axially separate under load, the respective gear carriers 44 engage their respective gear-carrier stops 58 on the interior of the housing side wall 34 with the rubbing element 62 sandwiched therebetween to reduce frictional loses. As such, relative axial separation of the epicyclic gear stages is only marginal at most, preventing or limiting undesirable lateral strain and thus improving robustness and work-life longevity.

Figure 5:
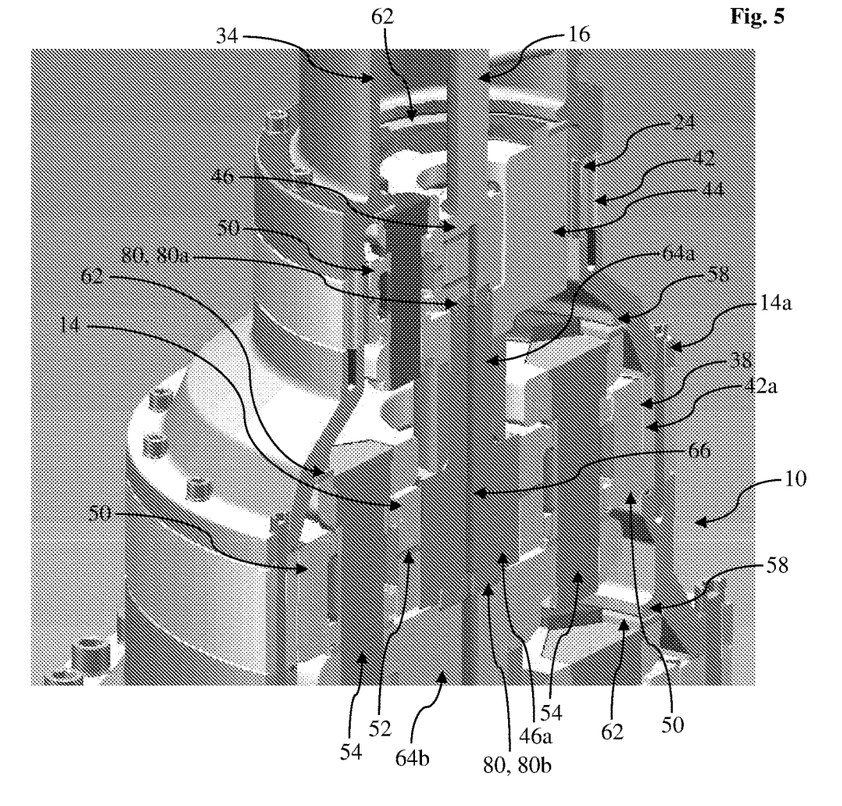
FIG. 5 is an enlarged view of part of a mid-portion of the drive unit, showing an internal lubrication channel and a lubricating bearing element.

The aforementioned sun gear 46 of the first epicyclic gear stage 24 is provided at one end of the drivable input element 16, which thus forms a sun-gear drive shaft 64. Extending in the first sun gear 46 of the first epicyclic gear stage 24, and axially through the second and third sun gears 46a, 46b of the second and third epicyclic gear stages 38, 40, respectively, is a primary lubrication channel 66, coaxial with the drive housing 14a and with a rotational axis of each sun gear 46. The primary lubrication channel 66 is thus formed of multiple separate parts which are axially liquidly interconnected to extend from or adjacent to the upper housing portion 22 to or adjacent to a lower housing portion 68.

The primary lubrication channel 66 preferably does not extend through the entire axial extent of the first sun gear 46, due to the drivable input element 16. Consequently, two laterally-extending secondary lubrication channels 70 are provided which extend from the primary lubrication channel 66 to a circumferential toothed surface of the first sun gear 46. The laterally-extending secondary lubrication channels 70 are in axial spaced relationship relative to the first sun gear 46. A plurality of such secondary lubrication channels 70 is preferred to assist with lubrication liquid flow, but it may be feasible to utilise only one, or more than two may be provided as required.

The part of the primary lubrication channel 66 extending through each epicyclic gear stage preferably has a uniform or substantially uniform lateral cross-section along at least a majority of its longitudinal extent. However, it is also preferred that the lateral extent stepwise increases at each epicyclic gear stage relative to the preceding epicyclic gear stage. This is beneficial in encouraging lubrication liquid flow through the secondary lubrication channels 70 and along the primary lubrication channel 66, consequently improving lubrication liquid movement from the upper housing portion 22 to the lower housing portion 68.

To transmit rotational drive to the second epicyclic gear stage 38 having a larger diametrical and axial dimension than the first epicyclic gear stage 24, a second sun-gear drive shaft 64a is axially engaged with the first gear carrier 44 of the first epicyclic gear stage 24. As such, the primary lubrication channel 66 extends axially through the second sun-gear drive shaft 64a and the second sun gear 46a. A similar arrangement is provided for the third epicyclic gear stage 40, which in turn has a larger diametrical and axial dimension than the second epicyclic gear stage 38. In this way, the first, second and third sun gears 46, 46a, 46b in this embodiment are all in liquid communication with each other on their rotational axes.

Coupled to a mid-housing portion 72 of the drive housing 14a, the lower housing portion 68 has the driven output element 18, being in this case a two interengaged-part output drive shaft 74, rotatably mounted therein and projecting therefrom. A proximal end of the driven output element 18 is coupled to the bottom of the third gear carrier 44b of the third epicyclic gear stage 40, although it may be integrally formed as part of the third gear carrier 44b. A distal end 76 extends from the housing 12 and the drive housing 14a to be releasably engagable with an earth-moving tool bit.

The proximal end of the driven output element 18 includes a final axial part 66a of the primary lubrication channel 66, thereby being in liquid communication on its rotational axis with the first, second and third sun gears 46, 46a, 46b. A further laterally-extending secondary lubrication channel 70a extends from the final axial part 66a of the primary lubrication channel 66, enabling the discharge of lubrication liquid into a lower lubrication-liquid cavity 78 defined by the lower housing portion 68.

To further improve lubrication, particularly between the interengaged first, second and third epicyclic gear stages 24, 38, 40, a lubricating bearing element 80 is utilised to marginally space a preceding sun gear 46, 46a, 46b from the subsequent sun-gear drive shaft 64a, 64b, or in the case of the third sun gear 46, the output drive shaft 74.

Each lubricating bearing element 80 preferably increases in diametrical and axial extents as the epicyclic gear stages increase in size, and includes part 66b of the primary lubrication channel 66 extending along its centre axis. As such, similarly to the first, second and third sun gears 46, 46a, 46b, the first, second and third lubrication bearing elements 80, 80a, 80b are in liquid communication with each other, despite being axially spaced apart.

Figure 6:
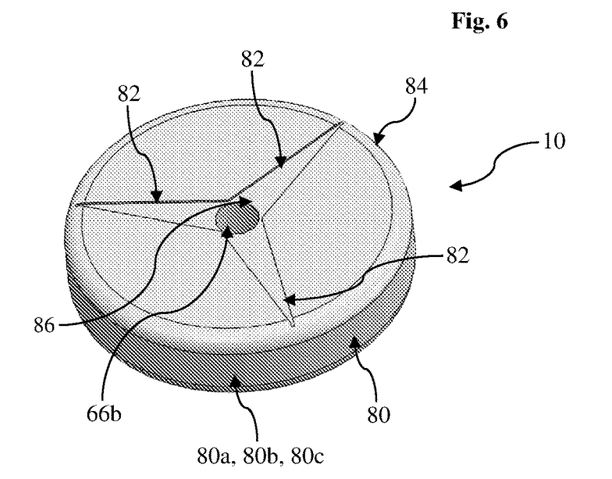
FIG. 6 is a perspective view from above of one example of the lubricating bearing element.

Advantageously, each lubricating bearing element 80, 80a, 80b has three equi-angularly spaced apart radially-outwardly extending tertiary lubrication channels 82 of reducing cross-section. This is best seen in FIG. 6. The tertiary lubrication channels 82 are provided on an in use upper surface of the lubricating bearing element 80, and in this case comprise a longitudinal extent which is V-shaped or substantially V-shaped, tapering convergently towards a perimeter edge 84.

In this embodiment, a depth of each tertiary lubrication channel 82 is constant. However, additionally or alternatively to the convergent longitudinal extent, the depth of the tertiary lubrication channel 82 may decrease along the longitudinal extent towards the perimeter edge 84. It may also be feasible that one or more of the tertiary lubrication channels 82 may be geometrically different to the other or others.

Although three tertiary lubrication channels 82 are suggested, less or more than three may be utilised. For example, in the case of only one tertiary lubrication channel 82, a spiral channel may be considered with one or more of the above-described characteristics.

In any event, the or each tertiary lubrication channel 82 is in liquid communication with the said primary lubrication channel part 66b extending along its centre axis. An inlet 86 of each tertiary lubrication channel 82 preferably has the same or a similar area to that of a lateral extent of the primary lubrication channel part 66b, thereby promoting lubrication liquid flow ingress. Due to the longitudinal extent of the tertiary lubrication channel 82 tapering, liquid pressure increases, thus forcing lubrication liquid axially out of the tertiary lubrication channel 82 and thus marginally hydraulically lifting the neighbouring sun gear 46 seated thereon. As such, a portion of lubricating liquid travelling along the primary lubrication channel 66 from the upper housing portion 22 towards the lower housing portion 68 is forced onto the seating of the sun gear 46 to form a lubricating film.

Although the above embodiment has been described with a sun-gear drive shaft 64 extending upwardly of its associated sun gear 46, it is feasible that this arrangement may be inverted whereby the sun-gear drive shaft extends downwardly in use from its associated sun gear. In this case and in particular regard to the lubricating bearing element, the sun-gear drive shaft may be seated on the lubricating bearing element with the subsequent sun gear supporting the lubricating bearing element, being the reverse of the above-described embodiment.

Furthermore, although three epicyclic gear stages 24, 38, 40 have been described in order to provide a reduction drive mechanism between the drivable input element 16 and the driven output element 18, less or more than three epicyclic gear stages can be utilised. Furthermore, one or a combination, but not necessarily all, of the above-described features may be incorporated into an earth-moving-tool drive unit 10. More particularly, it may not be necessary to include all of the above described features in each epicyclic gear stage. For example, if two epicyclic gear stages are more integrally formed together, only a single uppermost rubbing element 62 and gear-carrier stop 58 on the drive housing 14a may be required. Furthermore, in this example, the lubricating bearing element 80 between the two epicyclic gear stages may be omitted.

In terms of modularity, one or more of the rubbing element 62, lubricating bearing element 80, internal lubrication channel 66, and heating system 28 may be dispensed with, dependent on necessity and requirements. Furthermore, although the above-described embodiments advantageously relate to epicyclic gear mechanisms, one or a combination of the said novel features may be applicable to drive units using other kinds of gear trains or mechanisms, such as worm drives and bevel drives.

By providing the separate gear stages, modular drive units can be assembled as required by bolting or otherwise connecting the stages together to form the housing 12 and, more particularly the drive housing 14a.

Figure 7A:
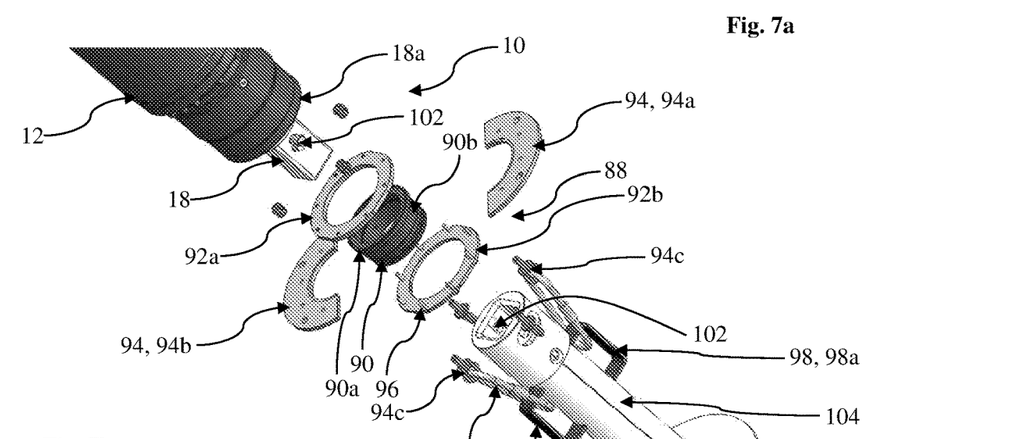
FIGS. 7a and 7b show an exploded view and assembled view, respectively, of one embodiment of an anti-disengagement mechanism which prevents or limits unintentional disengagement of a tool and/or remotely drivable machine from an output drive shaft of the secondary drive unit.
Figure 7B:
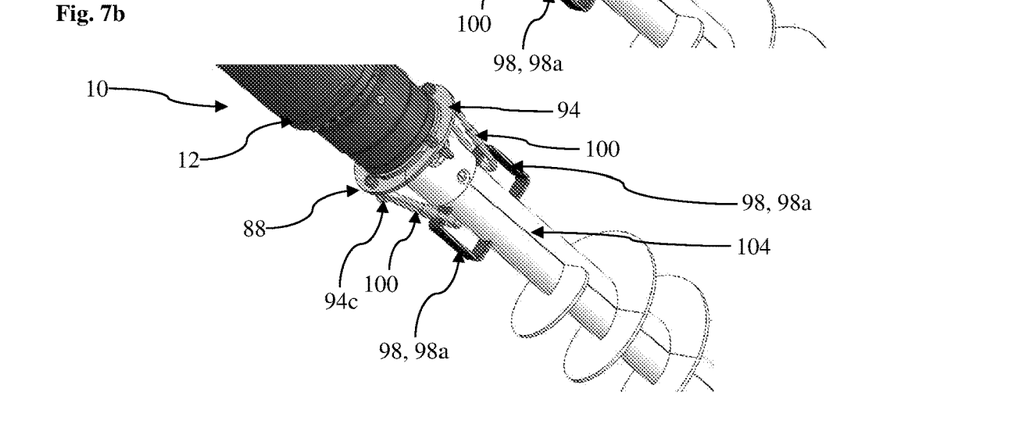

Referring to FIGS. 7a and 7b, a further preferred improvement to the secondary drive unit 10 is now described. To prevent or limit unintentional separation or disengagement of the tool bit or a remotely driven machine from the driven output element 18 at the end of the housing 12, an anti-disengagement mechanism 88 is provided. As above, this anti-disengagement mechanism 88 may be utilised alone or in combination with one or more of the above-described improvements.

The anti-disengagement mechanism 88 utilises an internally screw-threaded collar 90 which is threadingly engagable with a projecting end of the driven output element 18, and two continuous ring-like engagement plates 92a, 92b which locate around the collar 90.

An outer circumferential surface of the collar 90 preferably includes an upper flange 90a, such that the collar 90 closes or assists in closing a lower end of the housing 18. To prevent or limit unintentional release or backing-off of the collar 90, at least one and preferably two grub screws or other suitable retaining means or retainer, such as a circlip or split ring, is/are used.

The coupling plate 94 comprises two diametrically separable plate parts 94a and 94b which preferably seat in a groove 90b in the outer circumferential surface of the collar 90, axially spaced below the upper flange 90a.

Proximal and distal said engagement plates 92a, 92b are slidably receivable onto the collar 90. The engagement plates 92a, 92b sandwich the coupling plate 94 therebetween using a plurality of spaced-apart screw-threaded fasteners 96, so that the two parts 94a, 94b are locked together in the groove 90b. The two-part coupling plate 94 is thus securely held to the collar 90, which in turn is screw-threaded engaged with the output drive element 18.

Although preferably engaged with the output drive element 18, the collar 94 could be formed as part of the housing, or engaged therewith, for example, by utilising a race or similar device to enable low friction rotation.

The coupling plate 94 includes at least one coupling element, in this case being four equi-angularly spaced-apart eyelets 94c. Alternatively, any suitable housing-side coupling element can be utilised, such as one or more apertures in the coupling plate.

A radially-outwardly extending tool- or remote-machine-side element 98 is also provided; either integrally formed as one-piece on a shaft of the tool bit or the remote machine to be drivable by the secondary drive unit, or alternatively engaged with the shaft as a separate element such as a further collar which, for example, may be rotatable on the shaft.

In this case, two opposing outriggers 98a are provided, in the form of loop-type handles, permanently and fixedly engaged with the shaft of the tool bit or remote machine at or adjacent to its proximal end.

A retainer 100, preferably being releasable to simplify removal of the tool bit or decoupling of the remote machine, is then used to interconnect the outriggers 98a and associated eyelets 94c. Conveniently, the retainers 100 may be carabineers with suitable loading capacity.

With the collar 90, two engagement plates 92, and coupling plate 94 mounted on the drivable output element 18, the tool bit or remote machine can also then be releasably engaged with the drivable output element 18, typically using the standard or traditional known pin-locking mechanism 102, whereby a headed locking pin 102 with split pin retainer 102 is inserted through the mounted shaft 104 of the tool bit 106 or remote machine and the drivable output element 18, as shown in FIG. 7b, to releasably lock the two components together.

Thereafter, the retainers 100 can be applied to interengage the outriggers 98a and the eyelets 94c.

Although a specific anti-disengagement mechanism has been described above, any suitable anti-disengagement means can be considered. Preferably, however, the shaft of the tool bit or the remote machine is separately tethered either directly or indirectly to the output drive element and/or the housing of the secondary drive unit.

Although the gear-carrier stop 58 is preferably integrally formed as one-piece with the drive housing 14a, it may be a separate inwardly-projecting land or lip, for example, by providing a separate ring flange sandwiched between two housing parts.

Furthermore, although it is preferred that a drive housing for the gear mechanism is provided and housable within an outer housing which is attachable to a driving machine, it is feasible that the drive housing and the outer housing can be one and the same.

In terms of application of the secondary drive unit, it can be conveniently used with ground auger drill bits, earth moving bits, as well as screw-threaded ground anchor installation, helical screw pile installation, and core barrelling, to name just a few. The secondary drive unit may also be attachable to other kinds of vehicle having a primary, typically motive, drive unit, such as a rotary drilling rig with or without a guide mast, along with other options such as remote machines, for example, being a conveyor. This advantageously allows mobile site installation and operation with fewer and/or interchangeable components.

It is thus possible to provide a secondary drive unit, which may be an earth-moving-tool drive unit and/or a remote-machine drive unit, which prevents or reduces gear train lift and thus separation, reducing the likelihood of lateral strain breakage along a central rotational axis. The provision of an internal lubrication channel by the omission of a central tie-in improves upper to lower lubrication liquid movement, whilst also retaining the lubrication liquid internally within the main interior cavity of the drive unit housing and thus overall improving the efficiency of the lubrication. By utilising radially tapering liquid flow channels in a spacer element, a lubricating film is impartable to the underside of a seated gear, again improving device longevity. It is also possible to decrease component wear, particularly in cold climates, by utilising the pre-heating system thereby allowing improved lubrication liquid movement around the interior of the drive unit housing. The modularity of the housing, and particularly the drive-gear housing, also provides for reduced stock requirements and thus more cost-effective manufacturing, allowing customers to specify their requirements and the drive unit built appropriately. The anti-disengagement mechanism is particularly advantageous in terms of health and safety, should the primary locking means or mechanism fail, thereby preventing or limiting separation of the shaft being driven from the drive unit.

The words "comprises/comprising" and the words "having/including" when used herein with reference to the present invention are used to specify the presence of stated features, integers, steps or components, but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A secondary drive unit adapted to demountably attach to a machine having a primary drive unit and a power take-off, the secondary drive unit comprising:

a housing adapted to attach to the machine, a drivable input element adapted to be driven by the primary drive input of the machine at or adjacent to one end of the housing, a driven output element at or adjacent to the other end of the housing adapted to drive a tool or another machine, and at least one rotatable gear carrier in the housing adapted to be driven by the drivable input element, an interior surface of the housing including a radially-inwardly projecting gear-carrier stop which overlaps an upper edge of the at least one rotatable gear carrier, and a low-friction rubbing element formed of a low-friction material relative to that of the housing interposed between the gear-carrier stop and the at least one rotatable gear carrier to prevent or limit gear-carrier lift;

further comprising a sun gear coaxially aligned within the at least one rotatable gear carrier, a lubricating bearing element on which the sun gear or a sun-gear drive shaft is seated, and a primary internal lubrication channel in the sun gear or sun-gear drive shaft and the lubricating bearing element adapted to circulate lubrication liquid from an upper interior portion of the housing to a lower interior portion of the housing, the lubricating bearing element including at least one radially-outwardly extending secondary lubrication channel of reducing cross-section which, in use, imparts a pressure increase to lubrication liquid moving along a longitudinal extent of the at least one radially-outwardly extending secondary lubrication channel thereby causing hydraulic lift of the associated sun gear or sun-gear drive shaft.

2. The secondary drive unit of claim 1, wherein the low-friction rubbing element is a continuous annulus.

3. The secondary drive unit of claim 1, wherein the gear-carrier stop defines a seat which is a continuous annulus.

4. The secondary drive unit of claim 1, wherein the gear carrier forms part of an epicyclic gear set.

5. The secondary drive unit of claim 1, wherein the at least one rotatable gear carrier includes a perimeter seat on which the rubbing element is seatable.

6. The secondary drive unit of claim 1, wherein the at least one rotatable gear carrier, gear-carrier stop and low-friction rubbing element form part of one stage of a plurality of differently sized epicyclic gear set stages within the housing.

7. The secondary drive unit of claim 1, further comprising a sun gear coaxially aligned within the at least one rotatable gear carrier, a sun-gear drive shaft to which the sun gear is mounted, and an internal lubrication channel in at least the sun gear for circulating lubrication liquid from an upper interior portion of the housing to a lower interior portion of the housing.

8. The secondary drive unit of claim 7, further comprising at least one subsidiary lubrication channel which extends radially within the sun gear from the internal lubrication channel, thereby providing a lubrication liquid flow path from a circumferential surface of the sun gear to the internal lubrication channel.

9. The secondary drive unit of claim 7, wherein the internal lubrication channel extends axially through the sun-gear drive shaft.

10. The secondary drive unit of claim 1, wherein the at least one radially-outwardly extending secondary lubrication channel has a converging taper.

11. The secondary drive unit of claim 1, wherein the at least one radially-outwardly extending secondary lubrication channel has a V-shaped or substantially V-shaped longitudinal extent.

12. The secondary drive unit of claim 1, further comprising a lubrication heating system having at least one electrically-operable heating element, a temperature sensor adapted to monitor a lubrication temperature within the housing, and a controller adapted to energize the at least one electrically-operable heating element based on a temperature sensed by the temperature sensor.

13. The secondary drive unit of claim 1, wherein the housing is formed by a plurality of housing elements adapted to interengage, each housing element including an epicyclic gear set which is of a different size to that of a neighboring housing element, the epicyclic gear set being adapted to interengage to provide drive reduction between the drivable input element and the driven output element.

14. The secondary drive unit of claim 1, further comprising an anti-disengagement mechanism adapted to prevent or limit unintentional disengagement of the tool and/or the another machine from the driven output element.

15. The secondary drive unit of claim 1, wherein the gear-carrier stop is integrally formed with the housing.

16. The secondary drive unit of claim 1, wherein the gear-carrier stop overlaps at or adjacent an outermost perimeter of the upper edge of the gear carrier.

17. The secondary drive unit of claim 3, wherein the seat is complementarily shaped to the stop.

18. The secondary drive unit of claim 5, wherein the low-friction rubbing element is a uniformly continuous annulus.

* * * * *